(No Model.)
J. M. GROPP.
BRAKE FOR STREET CARS.
No. 456,195. Patented July 21, 1891.
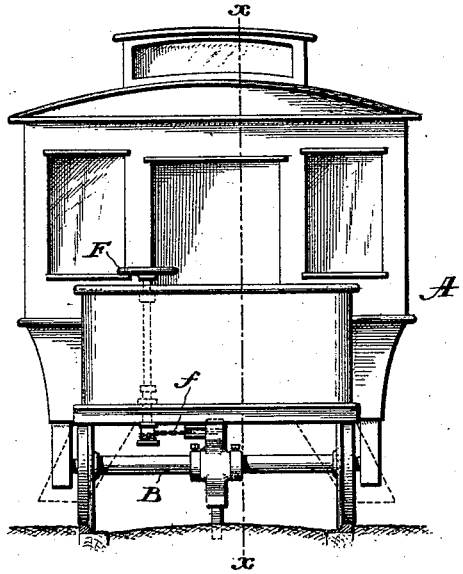
FIG. 1.
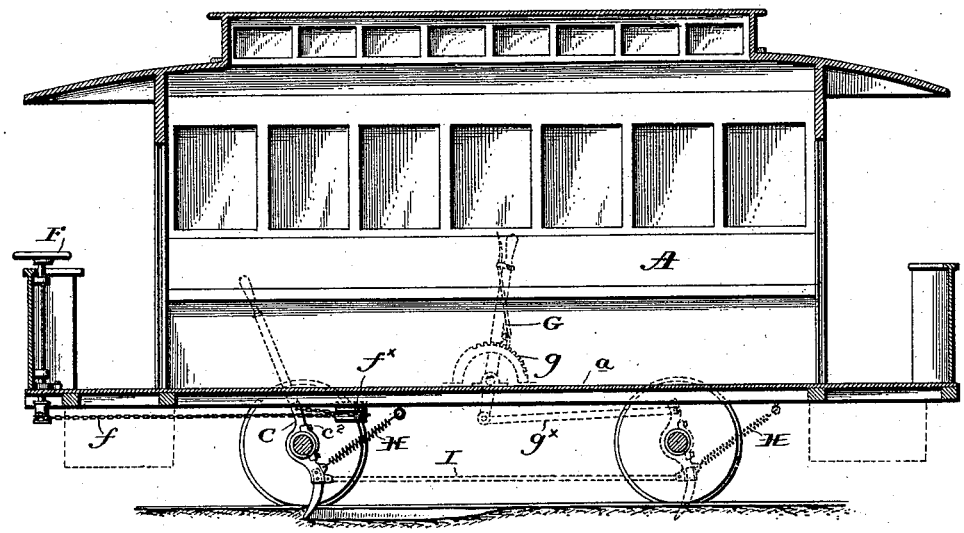
FIG. 2.
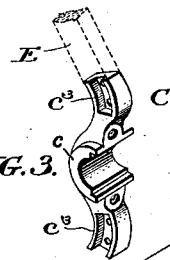
FIG. 3.
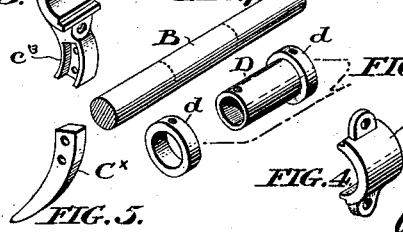
WITNESSES:
F. Norman Dixon
J. Howard Morris
INVENTOR:
Jno. M. Gropp
By his Attorneys,
Wm. E. Strawbridge
J. Bonsall Taylor
THE NORRIS PETERS CO., PHOTO-LITHO., WASHINGTON, D. C.

UNITED STATES PATENT OFFICE.

JOHN M. GROPP, OF WILMINGTON, DELAWARE.

BRAKE FOR STREET-CARS.

SPECIFICATION forming part of Letters Patent No. 456,195, dated July 21, 1891.

Application filed April 13, 1891. Serial No. 388,688. (No model.)

*To all whom it may concern:*

Be it known that I, JOHN M. GROPP, a citizen of the United States, residing at Wilmington, Delaware, have invented certain new and useful Improvements in Brakes for Street-Cars and other Vehicles, of which the following is a specification.

The object of my invention is the construction of a device adapted to be connected with the body of the vehicle to which it is applied, and to act upon the road bed over which the vehicle travels with sufficient gripping force to stop the headway of the vehicle; and my invention is particularly applicable to street cars to supplement the action of the usual wheel brakes.

A brake embodying my improvements in their simplest form and shown as applied to an ordinary street railway car, is represented in the accompanying drawings and hereinafter described, the particular subject-matter claimed as novel being hereinafter definitely specified.

In the drawings, Figure 1 represents in front elevation a car embodying my improvements; Fig. 2 represents the same car in side sectional elevation in the plane of the dotted line $x$ $x$ on Fig. 1, and sight being taken in the direction of the arrows upon said line. Figs. 3, 4, 5, and 6, are perspective details of different parts of the brake proper, and Fig. 7 is a perspective of a portion of the axle of the car.

Similar letters of reference indicate corresponding parts.

In the drawings, A represents the body of the car, and $a$ the floor of the same.

B are the axles, of any usual construction and represented as of the class to which the wheels are rigidly connected.

C is the body of my improved brake, conveniently made in the form shown in Fig. 3, and embodying near its center one half or member $c$ of a cylindric boxing, the other half or member of which $c^x$ is adapted to be connected by bolts $c^2$ to the body member. The body of the brake is conveniently formed with recesses or sockets $c^3$ in the lower one of which is adapted to be screwed a removable brake-bit $C^x$, preferably of the curved form shown, and adapted to make contact with the road bed when the body of the brake is deflected.

The brake as an entirety (body and bit) is conveniently adapted to be mounted upon the axle so as to be capable of oscillatory movement thereupon, and in order to prevent sliding or endwise movement of the brake upon the axle, I find it convenient to provide the axle with a cylindric sleeve D, having collars $d$ at its ends, and adapted by means of set screws or other equivalent devices to be fixed in proper position upon the axle. The sleeve within these collars is just about of the length of the boxing of the brake body, so that when the latter is applied to it the brake will be mounted upon the sleeve free from oscillation, but controlled against endwise movement. The sleeve and collars rotating with the axle act as a bushing within the boxing. If desired the sleeve and collars may be made in sections and clamped upon the axle. The brake bit is preferably made of chilled steel, and its lower end may be broadened or sharpened at will.

It is apparent that the backward throw of the upper end of the brake body will occasion the forward throw of the lower end and its grip against the road bed. The throw of the body of the brake may be effected in many ways, as, for instance, by a simple hand lever E (Fig. 3,) directly connected with the body of the brake. It is preferable, however to connect the upper portion of the brake body with an independent chain wheel or brake lever, through the intervention of a chain or link. Thus, for instance, in Figs. 1 and 2, I have represented the ordinary rotating hand or wheel brake F connected with the brake body by a chain $f$, passing around a chain pulley $f^x$, applied to the car floor or other fixed point of support to the rear of the brake. Thus, again, I have represented in dotted lines in Fig. 2, a brake lever G with the usual ratchet and pawl attachment $g$, which is erected within the car and the lower end of which is connected by a link $g^x$ to the upper extremity of my brake. It is obvious that the forward throw of the brake lever will occasion the operation of my brake.

In both of the constructions represented a retracting-spring H is represented, to maintain the brake bit normally off the road bed. In the drawings the brake bit is shown as in action.

It is apparent, as shown by the dotted line connecting link I, Fig. 2, that two brakes, one upon each axle, adapted to act in the same direction can be operated together by a single lever. It is also apparent that in the case of street cars which are not turned but driven from either end a brake may be applied to either axle to face a given end of car, and another brake be applied to either axle to face the opposite end of the car. If desired, of course, both brakes may be applied to the same axle. While it is apparent that it is cheaper and easier to apply my brake to an axle, yet it is obvious that it may be applied to any independent axial rod or other preferred support.

The advantages appertaining to my device, are that it is inexpensive, simple, easily applied to a car, and easily shifted laterally to different positions upon the axle;—and, further, that when the bit is worn out it can be easily replaced, the wear upon the road bed being but little.

Having thus described my invention, I claim:

1. In combination with a car axle or other axial support connected with the car, a brake, consisting of a body formed with a boxing, provided with a bit, and adapted to be oscillated with respect to its axle or support, substantially as and for the purposes set forth.

2. The combination to form a brake, of a car axle or other axial support, a brake body formed with one member of a boxing and provided with a removable bit, a sleeve fixed upon the axle and adapted to be inclosed between the body member of the boxing and a detached member adapted to be secured thereto, and means applied to the upper portion of the brake-body for occasioning its positive backward movement, substantially as and for the purposes set forth.

In witness that I claim the foregoing as my invention I have hereunto signed my name this 26th day of March, A. D. 1891.

JOHN M. GROPP.

In presence of—
J. BONSALL TAYLOR,
F. NORMAN DIXON.